UNITED STATES PATENT OFFICE.

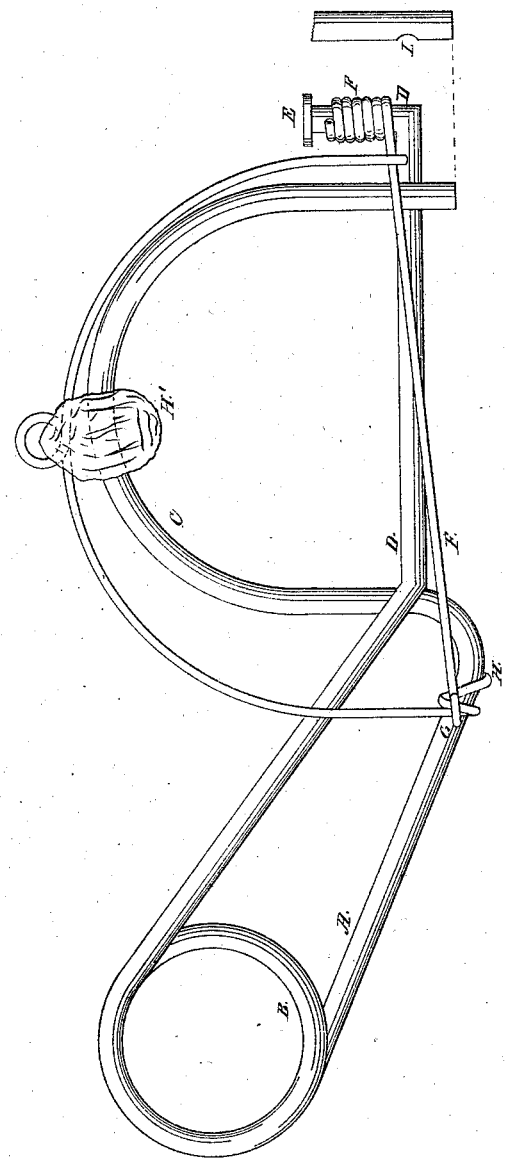

DAVID N. PHELPS, OF SAN LEANDRO, CALIFORNIA.

IMPROVEMENT IN ANIMAL-TRAPS.

Specification forming part of Letters Patent No. 58,286, dated September 25, 1866.

*To all whom it may concern:*

Be it known that I, DAVID NEVINS PHELPS, of San Leandro, county of Alameda, State of California, have invented certain new and useful Improvements in Animal Traps; and I do hereby declare the following description and accompanying drawings are sufficient to enable any persons skilled in the art or science to which it most nearly appertains to make and use my said invention or improvements without further invention or experiment.

Referring to the drawings, A represents a piece of wire, the center of which is bent or twisted so as to form nearly a double curl or spring, B, to obtain strength and elasticity. One arm of this wire is in form of nearly a half-circle, C, and when sprung is crossed by a parallel arm, D, which is nearly straight, and which constitutes the hold or trap for the animal. A portion of the arm D is bent at its end with a flat head, E, around which a piece of wire—of smaller diameter than that of the main portion of the trap—is coiled, constituting a spring or arm, F, the end of which is formed into an eye, G. Through this eye is inserted a wire still smaller in size, and kept in place by a single twist, one end of which is bent in the form of a contracted half-circle, to be removed, in setting, a short distance back from the main circle C, so as to catch the animal near the neck. To this piece the bait is attached. The other end of this wire has a straight arm, H, with bent end, which forms a catch to be placed under the arm of the main portion of the wire, A, crossing it at right angles back of the curve. A notch, I, is made at the end of the half-circle, or curve, or arm C, and when the parallel arm D is borne down it flies into it and the arm F is brought around against the curved portion or end of the circle C, holding it in the notch I, when the catch is placed under the arm A, back of the circle, which constitutes the setting of the trap.

A stick may be placed through the spring in the end of the trap to keep it upright, and a box or other device placed in front of the bait, so as to insure the animal's passing through the curve to reach the bait.

My improved trap will be found very serviceable for catching gophers—those pests of California farmers—as well as rats and other animals.

Having thus described my invention, what I claim, and desire to secure by Letters Patent, is—

A trap constructed of wire or iron, A, with mainspring B, semicircle C, parallel straight arm D, with bent head F E, said arm crossing the semicircle and forming the hold when sprung; when set, held in place by the bent arm H, and sprung by bait H', substantially as described, and for the purposes set forth.

In witness whereof I have hereunto set my hand and seal.

DAVID N. PHELPS. [L. S.]

Witnesses:
 C. W. M. SMITH,
 E. J. COWLEY, Jr.